US012537350B2

(12) United States Patent
Hwang et al.

(10) Patent No.: US 12,537,350 B2
(45) Date of Patent: Jan. 27, 2026

(54) COMPACT ELECTRICAL CONNECTOR HAVING LONGITUDINAL HOUSING WITH OFFSET GUIDING GROOVE ON ENDWALL OF THE LONGITUDINAL HOUSING

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Tzu-Yao Hwang, New Taipei (TW); Ming-Lun Szu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 400 days.

(21) Appl. No.: 18/115,906

(22) Filed: Mar. 1, 2023

(65) Prior Publication Data

US 2023/0283027 A1 Sep. 7, 2023

(30) Foreign Application Priority Data

Mar. 4, 2022 (CN) .......................... 202210208483.9
Mar. 4, 2022 (CN) .......................... 202220461975.4

(51) Int. Cl.

| | |
|---|---|
| ***H01R 24/60*** | (2011.01) |
| ***H01R 12/71*** | (2011.01) |
| ***H01R 13/405*** | (2006.01) |
| ***H01R 13/639*** | (2006.01) |

(52) U.S. Cl.

CPC ........... *H01R 24/60* (2013.01); *H01R 12/716* (2013.01); *H01R 13/639* (2013.01); *H01R 13/405* (2013.01)

(58) Field of Classification Search

None

See application file for complete search history.

(56) References Cited

U.S. PATENT DOCUMENTS

2019/0173232 A1 6/2019 Lu et al.
2020/0266584 A1* 8/2020 Lu .......................... H01R 12/75
2021/0399467 A1* 12/2021 Liu ...................... H01R 13/639
2022/0029360 A1 1/2022 Little et al.

(Continued)

FOREIGN PATENT DOCUMENTS

CN 212571495 U 2/2021
CN 112952423 A 6/2021
TW M579828 U 6/2019

*Primary Examiner* — Oscar C Jimenez

(74) *Attorney, Agent, or Firm* — Ming Chieh Chang

(57) ABSTRACT

An electrical connector includes: a longitudinal housing having opposite first and second sidewall, two endwalls connecting with the first and second sidewalls, and a mating tongue and defining a receiving cavity; two rows of terminals retained in the housing and arranged on opposite surfaces of the mating tongue; and a metallic shell surrounding the longitudinal housing and having two side plates respectively covering outer sides of the first and the second sidewalls, wherein each of the side plates defines a locking hole, at least one of the endwalls defines a guiding groove opening upwards, and a central axis in a longitudinal direction of the mating tongue is offset from a central axis in the longitudinal direction of the guiding groove.

7 Claims, 20 Drawing Sheets

(56) References Cited

U.S. PATENT DOCUMENTS

| | | | | |
|---|---|---|---|---|
| 2022/0336999 | A1* | 10/2022 | Lu | H01R 12/716 |
| 2022/0368076 | A1 | 11/2022 | Little et al. | |
| 2023/0052621 | A1 | 2/2023 | Little | |
| 2023/0128860 | A1* | 4/2023 | Liu | H01R 12/75<br>439/607.05 |
| 2024/0178607 | A1* | 5/2024 | Chen | H01R 13/502 |

* cited by examiner

COMPACT ELECTRICAL CONNECTOR HAVING LONGITUDINAL HOUSING WITH OFFSET GUIDING GROOVE ON ENDWALL OF THE LONGITUDINAL HOUSING

BACKGROUND OF THE INVENTION

Field of the Invention

The present invention relates generally to an electrical connector, particularly to a compact electrical connector.

Description of Related Arts

China Utility Model No. 212571495 discloses an electrical connector assembly including a board connector and a cable connector mating with each other. The cable connector defines a mating portion with a longitudinal slot and two guiding posts at a side of and spaced from the mating portion. The board connector defines guiding grooves to match with the guiding posts. Understandably, a transverse size of the connectors is large.

China Patent No. 112952423 discloses first and second inserting grooves of different lengths, i.e., polarizing features, so that one plug connector of a first type and another plug connector of a second type may mate with same receptacle connector.

SUMMARY OF THE INVENTION

The objective of the present invention is to provide a compact electrical connector.

To achieve the above object, 1. An electrical connector comprising: a longitudinal housing defining a longitudinal direction and comprising a first sidewall and a second sidewall opposite to the first sidewall, two endwalls connecting with the first and the second sidewalls and a mating tongue, commonly defining a receiving cavity among the first and the second sidewalls and the two endwalls and the mating tongue; two rows of terminals retained in the housing arranged on opposite surfaces of the mating tongue; and a metallic shell surrounding the longitudinal housing and comprising two side plates respectively covering outer sides of the first and the second sidewalls; each of the side plates defines a locking hole, at least one of the endwalls defines a guiding groove opening upwards, a central axis in the longitudinal direction of the mating tongue is offset from a central axis in the longitudinal direction of the guiding groove.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 10:
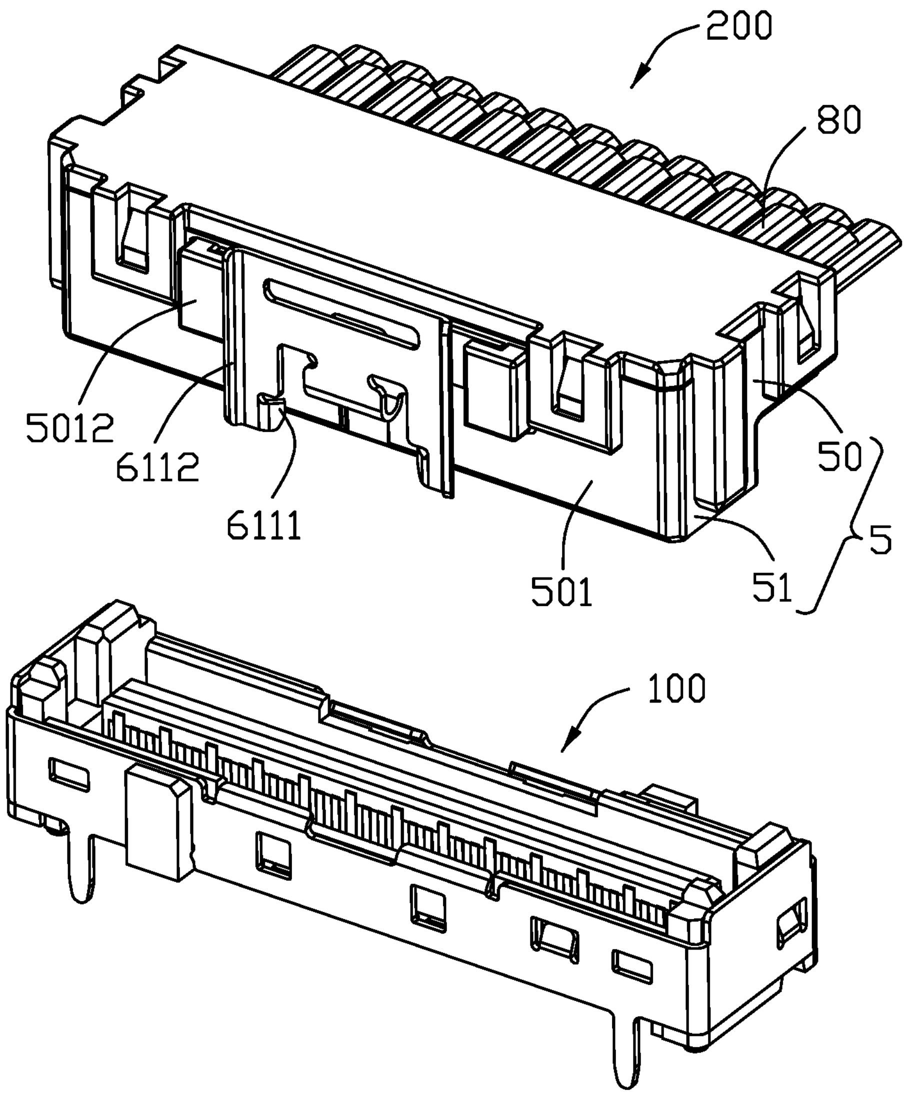
FIG. 10 is a perspective view of a cable connector and the board connector of this present invention.
Figure 13:
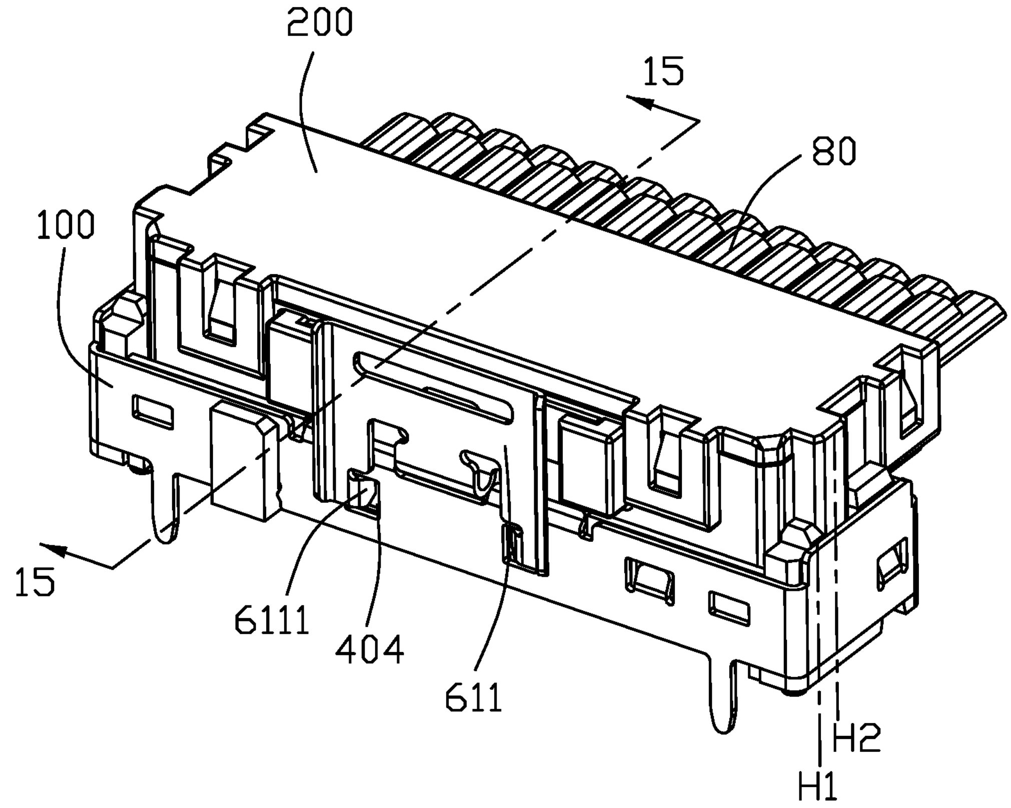
FIG. 13 is a perspective view of the electrical connector assembly including the cable connector and the board connector mated with each other in FIG. 10.

Referring to FIG. 10 and FIG. 13, an electrical connector assembly is illustrated, which includes a board connector 100 for being mounted on a printed circuit board (PCB, not shown) and a cable connector 200 connecting with cables 80. High frequent signal transmission is established after the two connectors are engaged with each other, wherein a locking member 61 of the cable connector 200 is latched with two locking holes 404 defined on the board connector 100. The locking member 61 is disconnected from the locking holes 404 by pressing the locking member 61 or pulling a strip defined on the cable connector 200. A description of the two connectors will be given hereinafter.

Referring to FIGS. 1-5, the board connector 100 includes an longitudinal housing 10 made from insulating material, two rows of terminals 21 and a metal shell 40. The housing 10 includes a first sidewall 101, a second sidewall 102 parallel to the first sidewall 101, two endwalls 103 connecting with longitudinal ends of the two sidewalls, and a mating tongue 104 extending in the longitudinal direction. A receiving cavity 11 is defined among the two sidewalls 101, 102, endwalls 103 and the mating tongue 104 for receiving the cable connector 200. The endwalls 103 are higher than the two sidewalls for a good guidance of the mating cable connector 200. Combined with FIG. 8, the terminals 21 includes mating portions 211 and leg portions 213 and middle portions 211 unitarily connecting with the mating portions and the leg portions. The mating portions 211 are of a blade and arranged along surfaces of the mating tongue 104.

Figure 5:
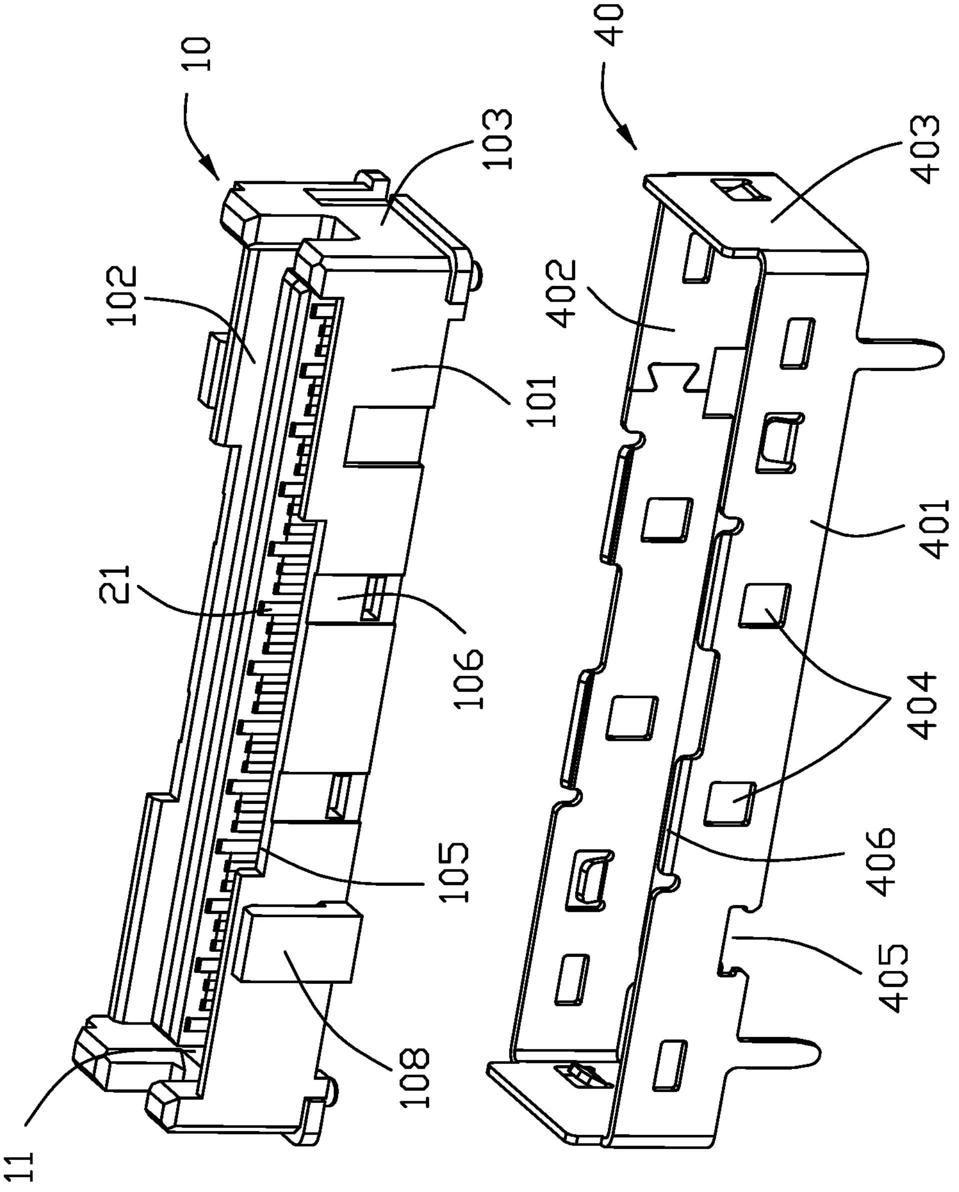
FIG. 5 is an exploded perspective view of the board connector in FIG. 1, wherein an outer shell is taken from the board connector.
Figure 6:
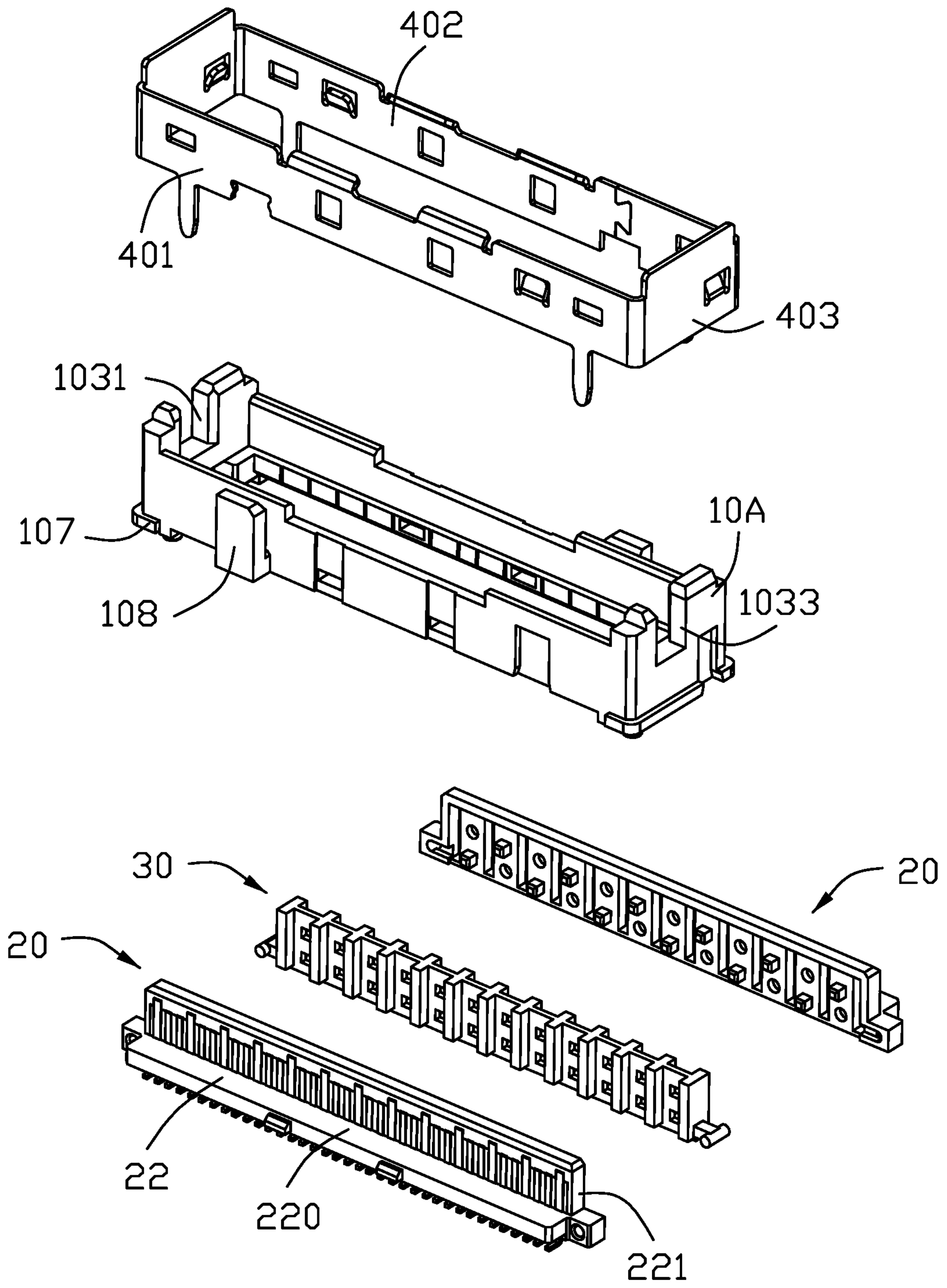
FIG. 6 is a further exploded perspective view of the board connector in FIG. 5.
Figure 7:
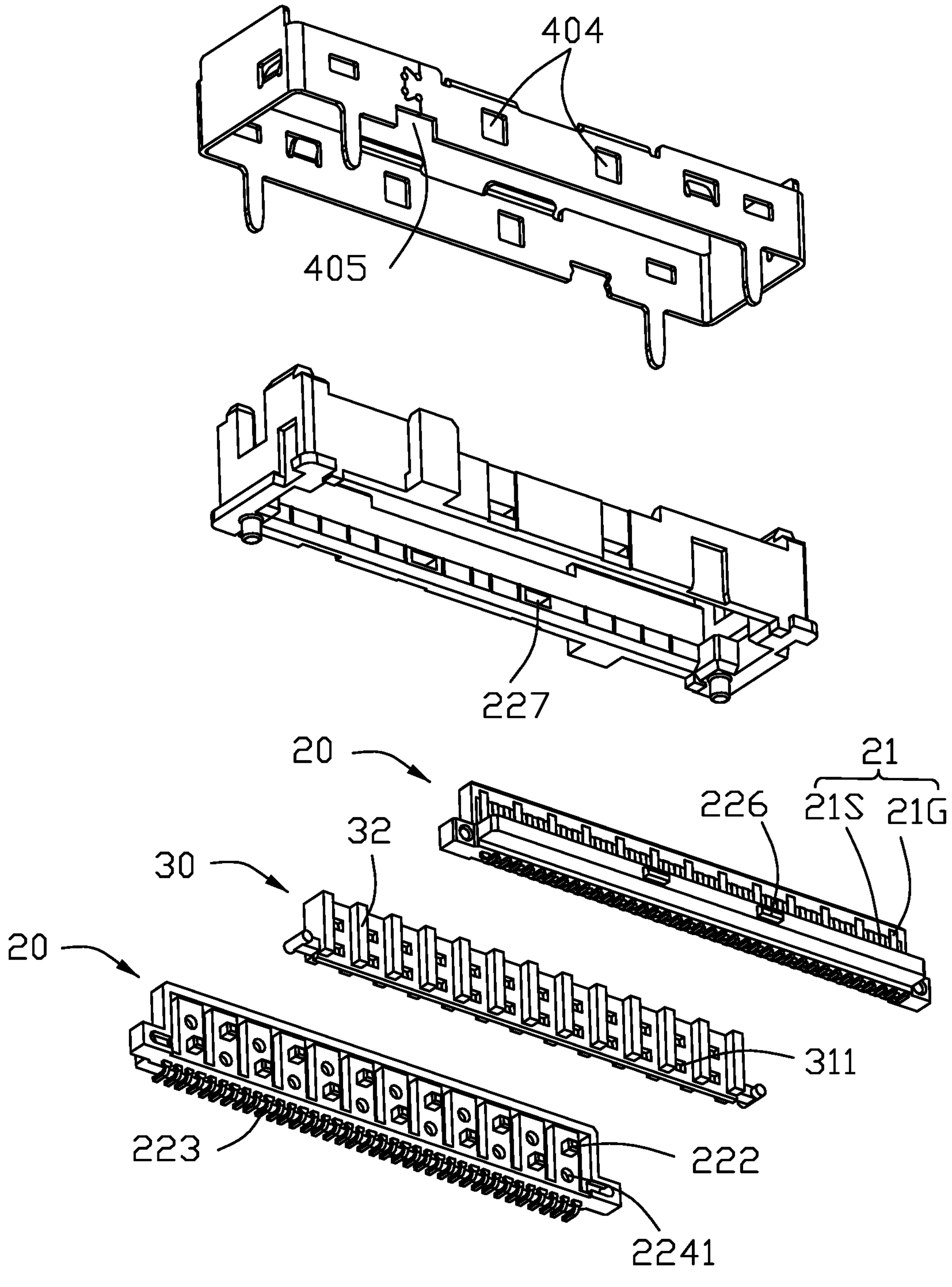
FIG. 7 is another exploded perspective view of the board connector in FIG. 6.

Referring to FIGS. 5-7, the metallic shell 40 includes a first side plate 401 and a second side plate 402 respectively covering outer faces of the first and the second sidewalls 101, 102 of the housing 10 and two end plates 403 covering the endwalls 404 of the housing 10. In this embodiment, the side plates 401,402 and the end plates 403 fitly cover the outer faces of the sidewalls and endwalls of the housing 10, to get a compact connector. The endwalls 103 is higher than the sidewalls 101, 102, the side plates 401, 402 are flushed with the sidewalls 101,102, the end plates 403 are lower than the endwalls 103. The first sidewall and the second sidewall each defines two locking holes 404, the locking member 61 defines two locking hooks 6111 to lock within the locking holes 404. Each sidewall 101, 102 define a first or longitudinal recess 105 recessed from a top thereof according to the locking holes 404. Each side plate 401, 402 defines a blocking edge 406 slanting into the longitudinal recess 105. In this embodiment as clearly seen in FIG. 4, the blocking edges 105 and the sidewalls 101, 102 at least partially overlap in an upper to lower view, i.e., an inserted direction of the board connector 100. Each sidewall defines two second or upright recesses 106 from the outer face thereof, the upright recess 106 go across the corresponding locking holes 404. The upright recesses 106 go through in the inserted direction, and the blocking edges 406 shelter from the upright recesses 106

Figure 1:
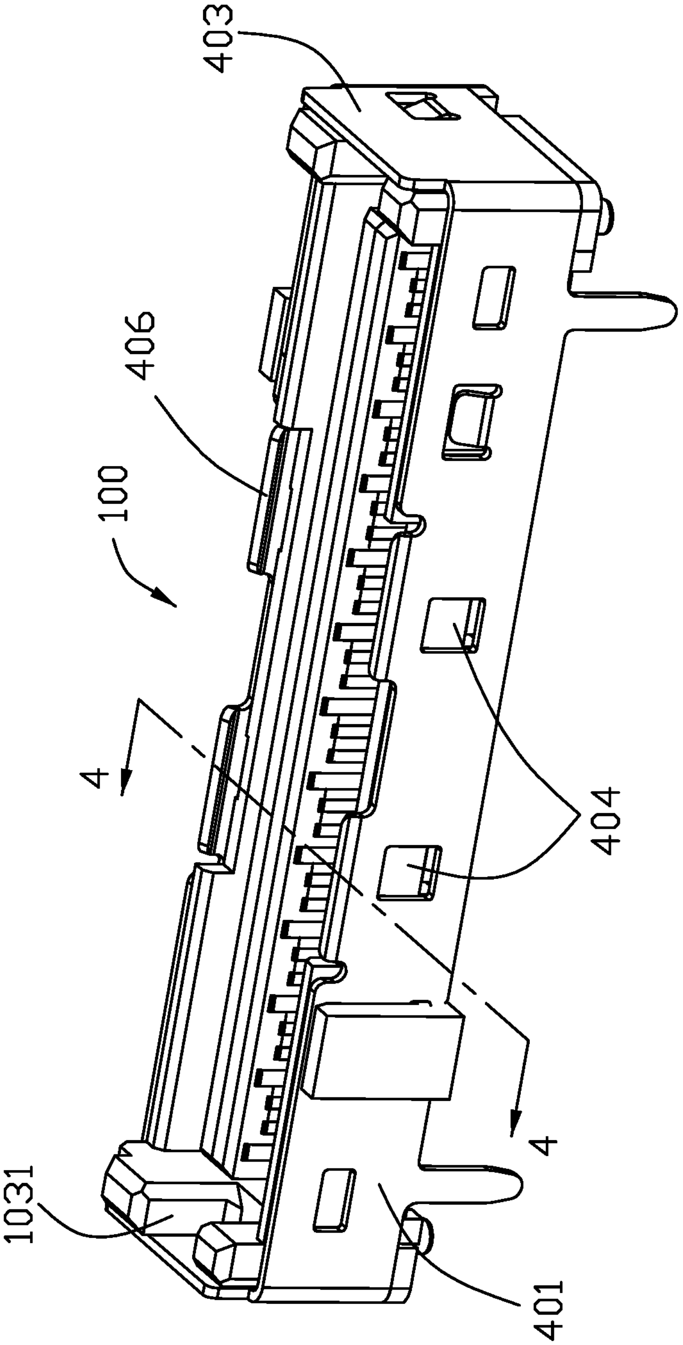
FIG. 1 is a top perspective view of a board connector of an embodiment of this present invention.
Figure 2:
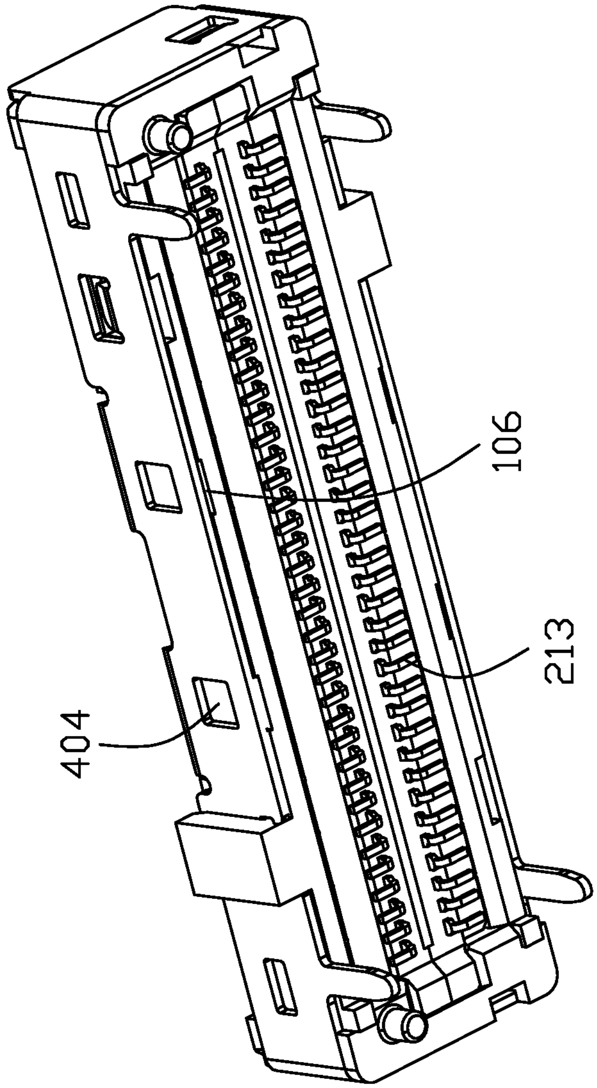
FIG. 2 is a bottom perspective view of the board connector in FIG. 1.
Figure 3:
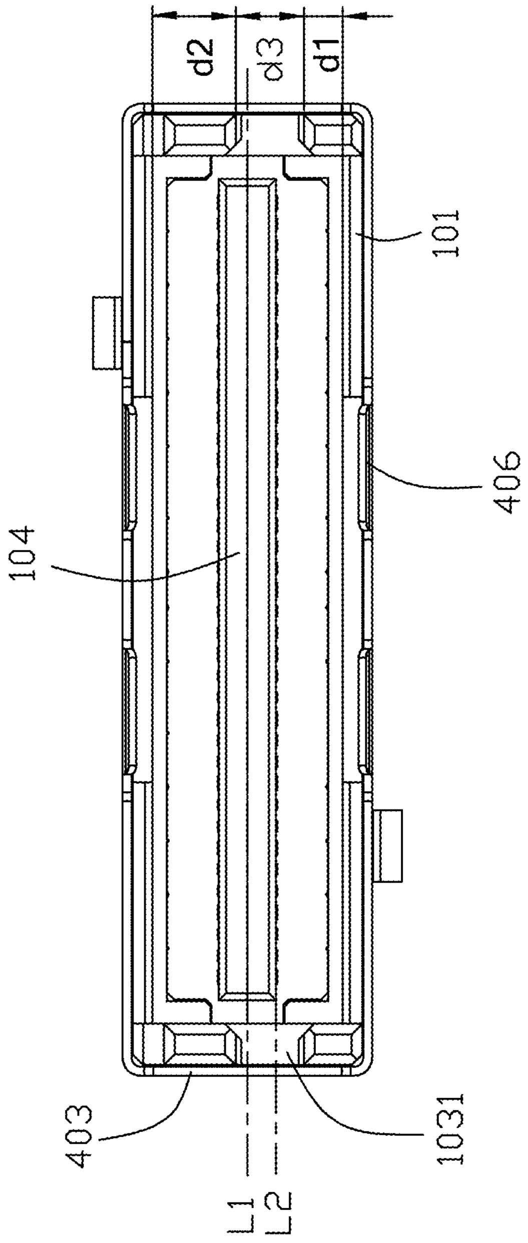
FIG. 3 is a top elevational view of the board connector of FIG. 1.
Figure 4:
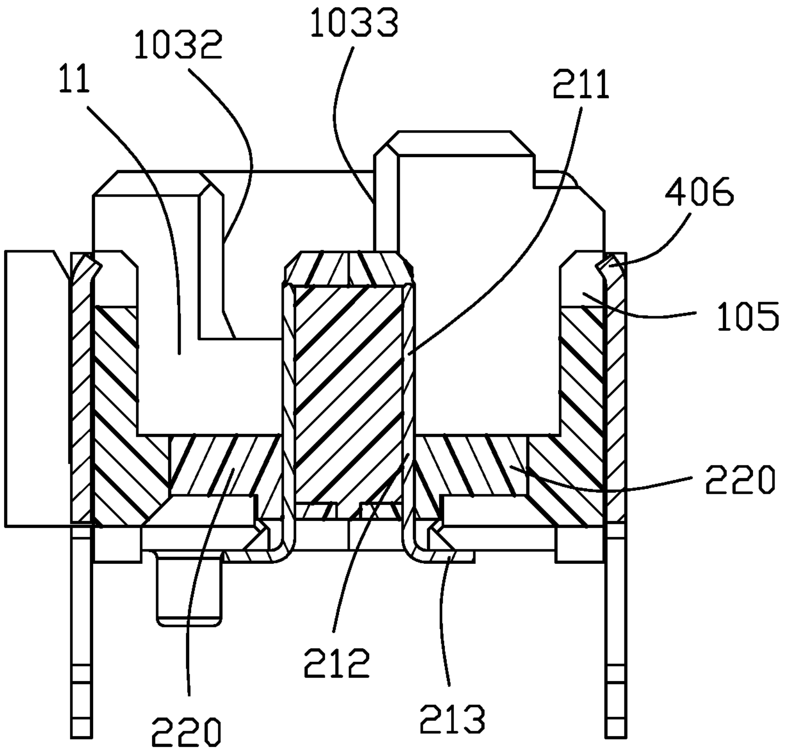
FIG. 4 is a cross-sectional view of the board connector taken along a broken line 4-4 in FIG. 1.

Combination with FIG. 6, at least one endwall 103 defines a guiding groove 1031 opening upward, the guiding groove 1031 defines a first inner face 1032 near to the first sidewall 101 and a second inner face 1033 near to the second sidewall 102 and facing the first inner face 1032. Referring to FIG. 3, the mating tongue 104 defines a longitudinal central axis L1 in the longitudinal direction, the guiding groove 1031 defines a longitudinal axis L2 in the longitudinal direction, the two longitudinal central axis L1, L2 are offset from each other. In this embodiment, the longitudinal central axis L2 of the guiding groove 1031 overlaps with a side of the mating tongue 104. The guiding grooves 1031 go through the corresponding endwalls in the longitudinal direction, while the end plates 403 seal the guiding grooves 1031 in the longitudinal direction. A first distance d1 is defined between the first inner face 1032 and an inner face of the first sidewall 101, a second distance d2 is defined between the second inner face 1033 and an inner face of the second sidewall 102, a third distance d3 is defined between the first inner face 1032 and the second inner face 1033. The first distance d1 is smaller than the second distance d2, the third distance d3 is larger than the first distance d1 but smaller than the second distance d2. Preferably, the first distance d1 is 1.075 mm, the second distance d2 is 2.35 mm, the third distance d1 is 1.8 mm.

Referring to FIGS. 6-9, each row of terminals 21 is embedded in an insulator 22 by an injection molding process, to form a terminal module 20. Each terminal module 20 includes one row of terminals 21 and the insulator 22, each row of terminals 20 includes signal terminals 21S and grounding terminals 21G. The insulator 22 includes a longitudinal base 220 and a tongue 221 perpendicular extending from the base 220. The mating portions 211 extend from the base 220 and disposed along the tongue 221, the leg portion 213 extend out of a bottom of the base 220, the middle portions 212 are embedded in the base 220. The insulator 22 defines slots 223, the mating portions 211 and the middle portions 212 of the grounding terminals 21G are exposed upon the corresponding slots 223. Each insulator 22 of the two terminal modules defines assembling posts 222 and first assembling holes 221, the assembly posts 222 and first assembly holes 221 are engaged with each other for preliminarily positioning of the two terminal modules 20. In a preferred embodiment, the assembling posts 222 are of a square post. Plastic conductive material is injected into a space between the two assembled terminal modules 20 and then cools to be a grounding member 30. The grounding member 30 is located between the two rows of terminals 21 and includes a longitudinal base 31 extending in the longitudinal direction and a plurality of ribs 32 unitarily projecting from lateral sides of the longitudinal base 31 and contact the corresponding grounding terminals 21G to get an electric grounding path. The ribs 32 go across the slots 223 and press against the grounding terminals 21G. The longitudinal base 31 defines second assembling holes 311 to allow the assembling posts 222 to go through.

Figure 8:
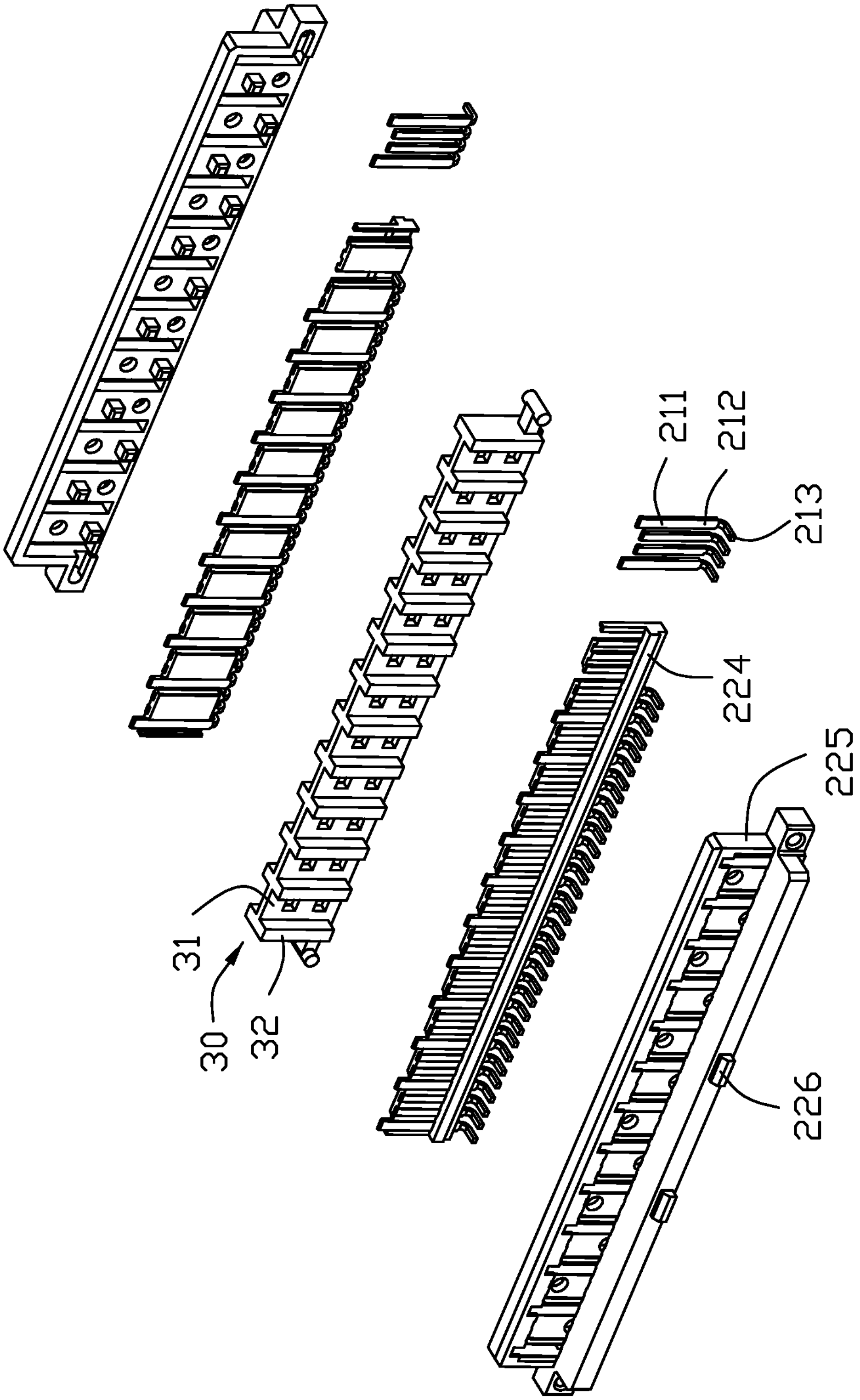
FIG. 8 is a further exploded perspective view of a terminal module assembly in FIG. 6.
Figure 9:
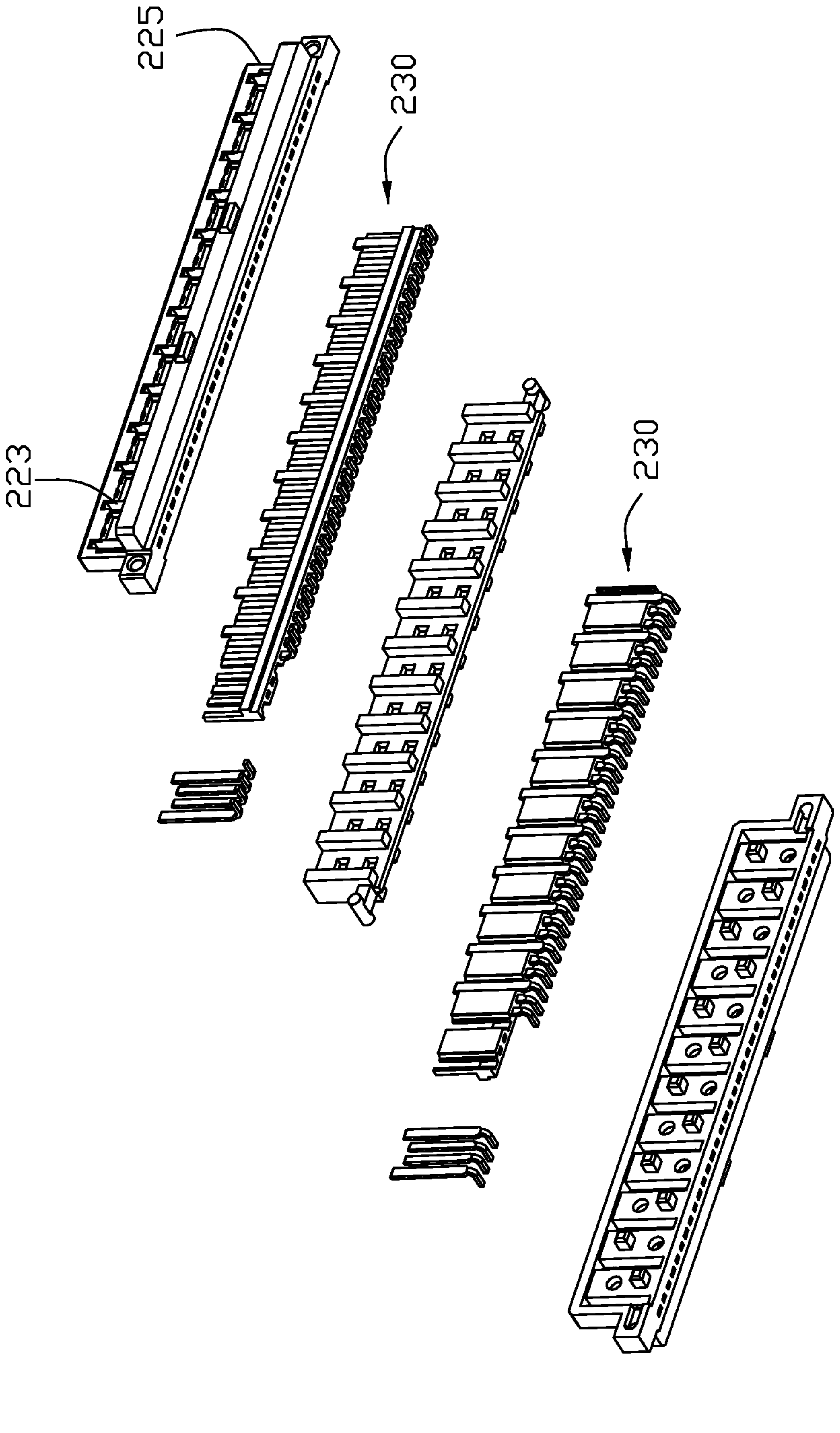
FIG. 9 is another exploded perspective view of the terminal module assembly in FIG. 8.

Referring to FIGS. 8-9, the insulator 22 is formed by two manufacturing process, that is, the insulator 22 includes a first portion 224 and a second portion 225. The row of terminals 21 and the first portion 224 are made together by a first injection molding process, to form a first mold 230. The first mold and the second portion 224 are made by a second injection molding process, to form the terminal module 20. The two terminal modules 20 are assembled together and then the conductive plastic are injected into the space between the two assembled terminal modules 20 to form the grounding member 30. Therefore, a unitary terminal module assembly is formed. The terminal module assembly is assembled in the insulating frame 10A consisting of the sidewalls 101, 102 and the endwalls 103 as shown in FIGS. 6-7. In this embodiment, as shown in FIG. 7, the insulator 22 defines a first retaining portion 226 to be retained in a second retaining portion 227 defined on the insulating frame 10A, the terminal module assembly is assembled and retained in the frame 10A from a bottom of the frame 10A. Alternatively, the metallic shell 40 can be assembled on the insulating frame 10A before the terminal module assembly.

Referring to FIGS. 5-6, in this embodiment, the housing 10 defines a skirt portion 107 proximately to the two endwalls 103. The sidewalls 101, 102 define L-shaped portions 108. The side plates 401, 402 of the metallic shell 40 seat on a lower portion of the L-shape portion 108 and are sandwiched between an upper portion of L-shaped portion and the outer sides of the sidewalls, wherein a notch 405 defined on each side plate is set on the lower portion of the L-shape portion. The bottom edges of the metallic shell 40 seat on the skirt portion 107

Figure 11:
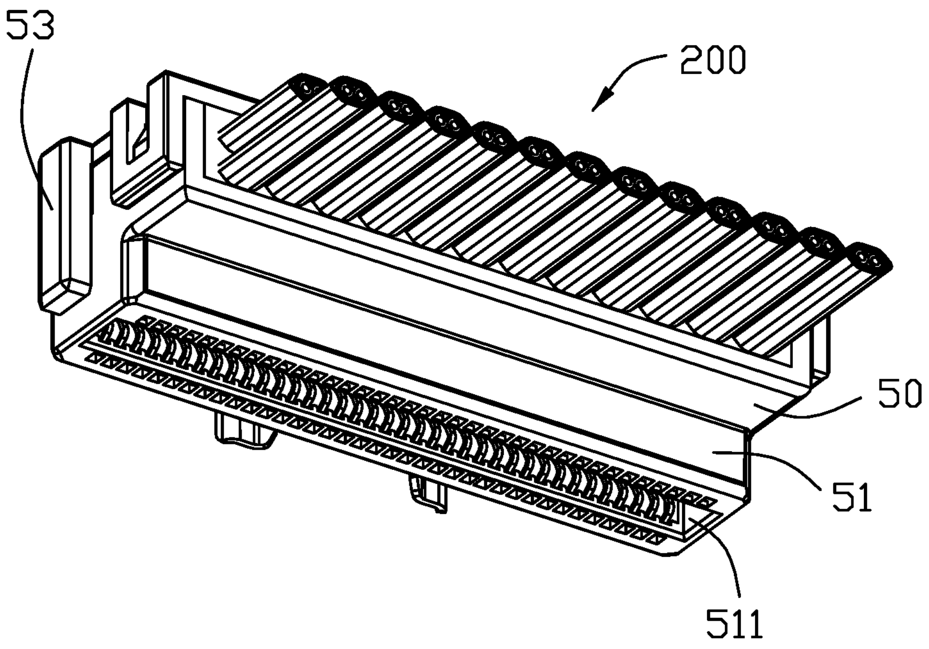
FIG. 11 is a bottom perspective view of the cable connector in FIG. 9.
Figure 12:
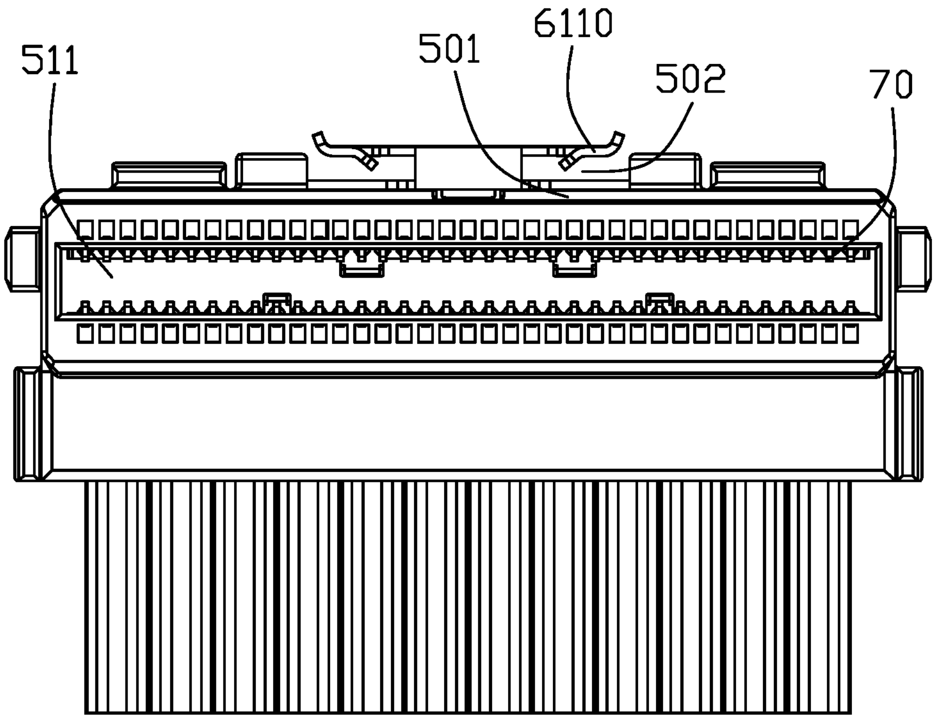
FIG. 12 is a bottom elevational view of the cable connector in FIG. 11.

Referring to FIGS. 10-12, the cable connector 200 includes a longitudinal housing 5 made from insulating material, contacts 70 retained in the longitudinal housing 5 and the locking member 61 retained on a first side face 501 of the housing, and the cables 80 connecting with contacts 70. The longitudinal housing includes a base portion 50 and a mating portion 51 extending from the base portion 50, the mating portion 51 defines a longitudinal mating slot 511 therein, the contacts 70 are arranged in two rows and along the two sides of mating slot 511. The housing 5 defines two guiding posts 53 at opposite outer sides along the longitude direction thereof, the guiding posts 53 extend from the base portion 50 to the mating portion 51.

Figure 17:
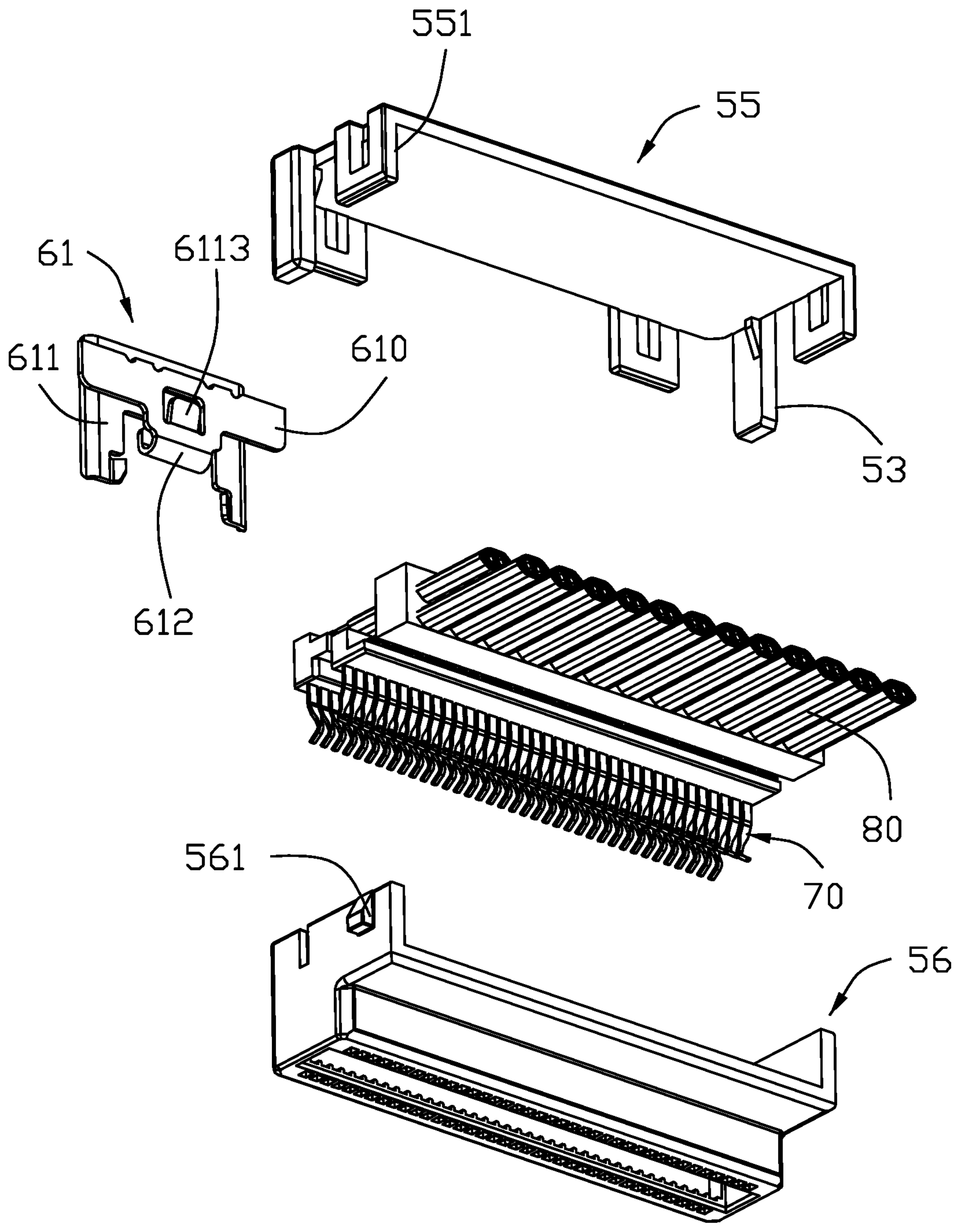
FIG. 17 is an exploded perspective view of the cable connector in FIG. 11.
Figure 18:
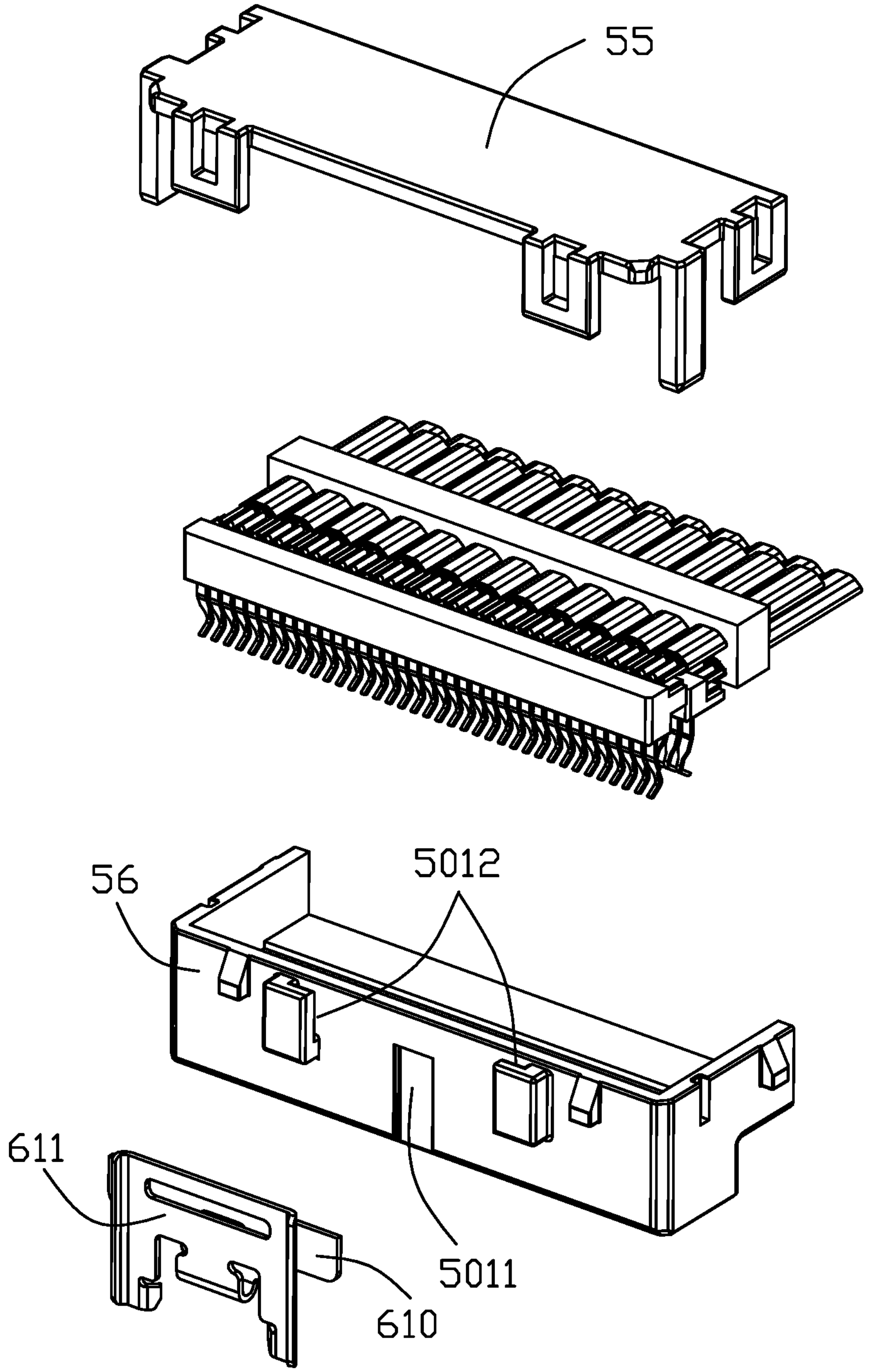
FIG. 18 is another exploded perspective view of the cable connector in FIG. 17.

Referring to FIG. 10 and FIG. 17, the locking member 61 includes a retaining plate 610, a locking plate 611 parallel to the retaining plate 610, and a connecting portion 612 of a U shape to provide elastic forces. The locking plates 611 with two locking hooks 6111 can pivot away from or near to the housing 50 by the connecting portion 612. The locking hooks 611 protrude toward the housing 50, that means, as shown in FIG. 13, the locking hooks 6111 protrude into the locking holes 404 of the board connector 100 when the cable connector 200 is inserted in the board connector 100. The locking plate 611 defines a larger central opening to from two locking arms 6110, each locking hook 6111 is a tab bending from an inner edge of locking arm 6110 toward the housing 50. The locking arms 6110 separates from the first side face 501 to define a gap 502 as shown in FIG. 12. The locking plate 611 further defines a turn-up portion 6112 perpendicular bending away from the housing 50. The housing 50 defines a retaining section in the form of two pock portions 5012 at the first side face 501 thereof, the retaining portions 610 is assembled downward and retained in the pock portions 5012. The locking plate 611 defines a tab 6113 which slants in the recess 5011 defined on the first side face 501 as shown in FIG. 18. As clearly shown, the locking member 61 and the retaining section are located above and/or outside of the board connector 100, thereby ensuring the locking member 61 from interfering with the board connector 100.

Figure 19:
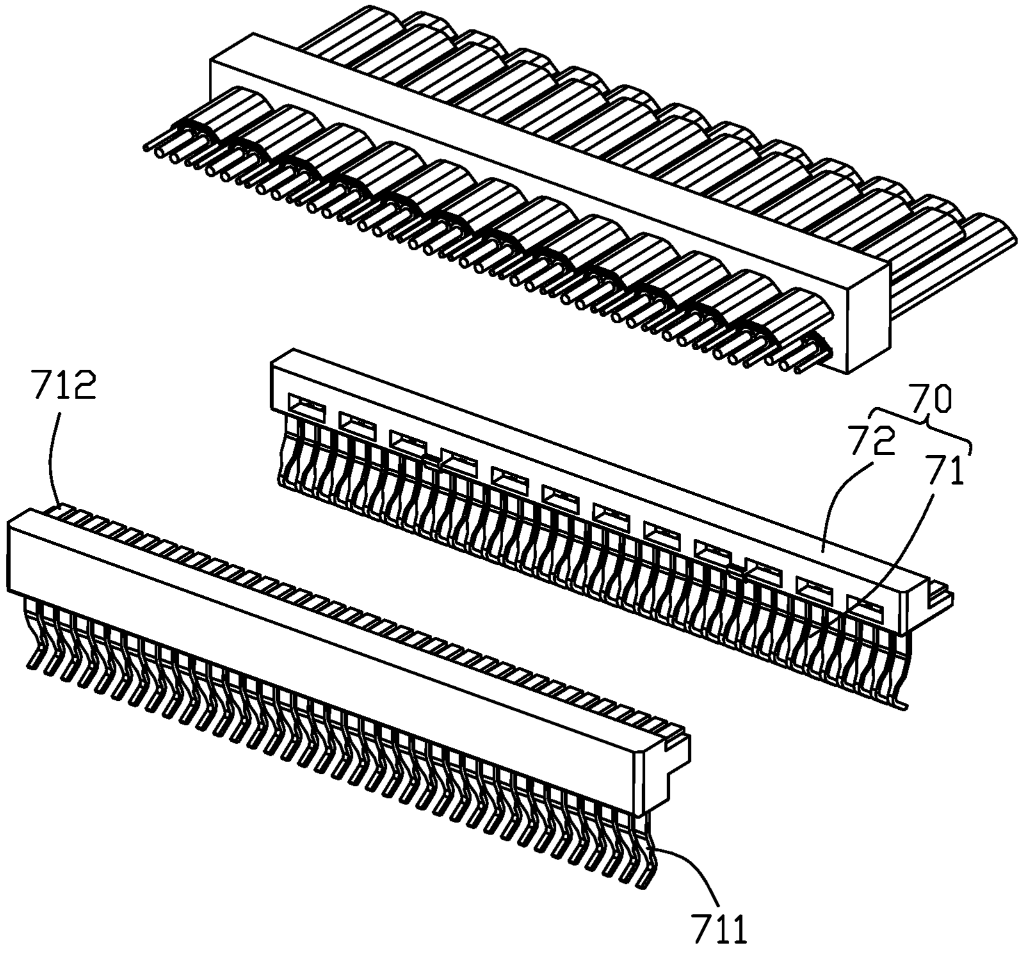
FIG. 19 is a further exploded perspective view of the contact modules and cables in FIG. 18.

Referring to FIGS. 17-19, the contacts 71 are arranged to two rows, each row of the contacts is injection molded with an insulator 72, to be a contact module 70. The contacts include elastic mating portions 711 and leg portions 712. The contact modules 70 are inserted downwards into the base portion 50, the mating portions 711 go across the base portion 50 and lines in the mating slot 511, the cables 80 are welded or soldered with the leg portions 712. In this embodiment, the housing 5 further includes a lower cover 56 surrounding the base portion 50 and the mating portion 51, and an upper cover 55 attached to the lower cover 56. The upper cover 55 defines a pair of latch arms 551 to latch with a latch lung 561 defined on opposite ends of the lower cover. The guiding posts 53 extend downwards from the upper cover.

Figure 14:
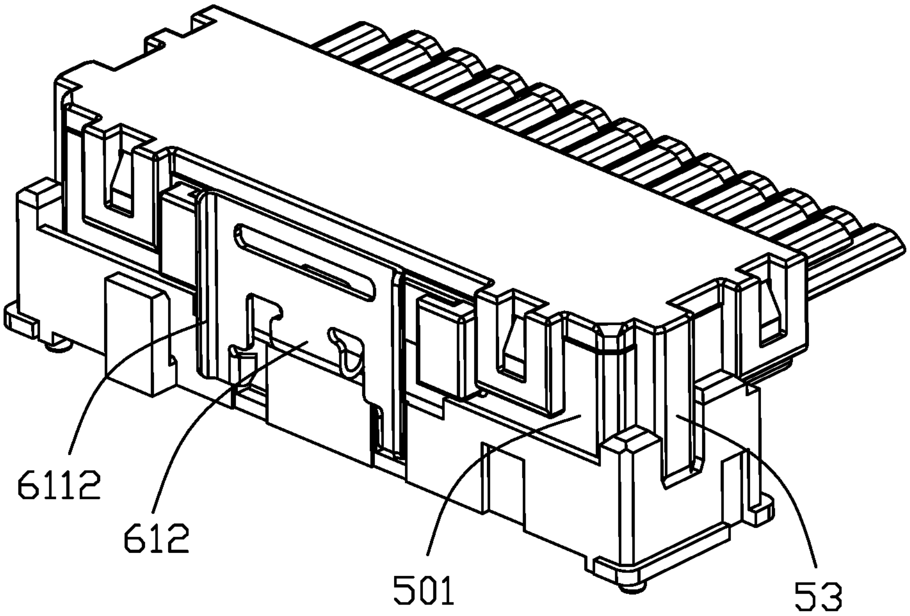
FIG. 14 is similar to FIG. 13, but a metallic shell is taken away.
Figure 15:
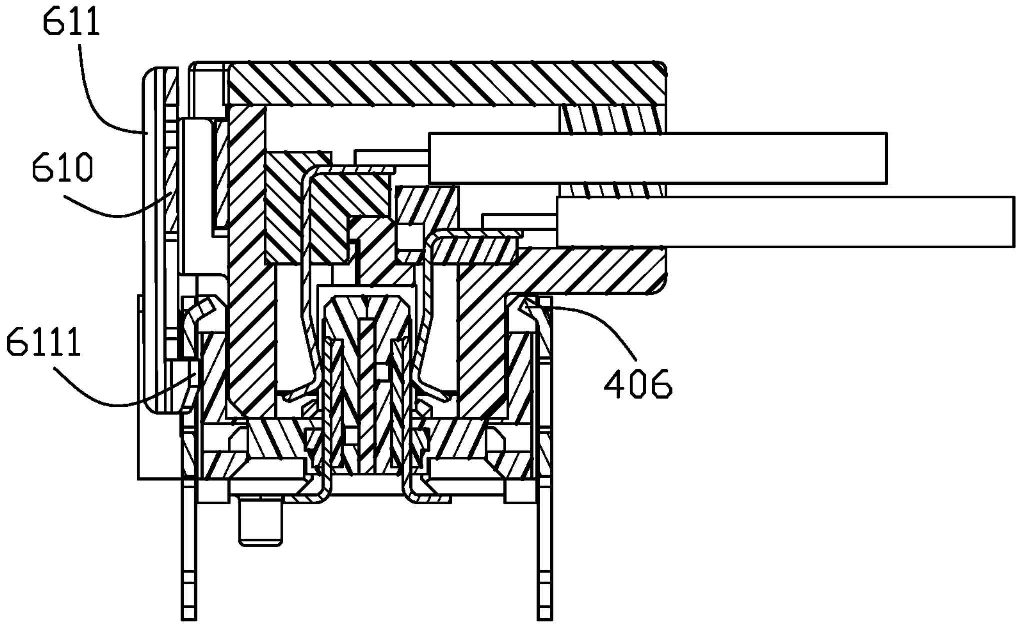
FIG. 15 is a cross-sectional view of the electrical connector assembly taken along a broken line 16-16 in FIG. 13.
Figure 16:
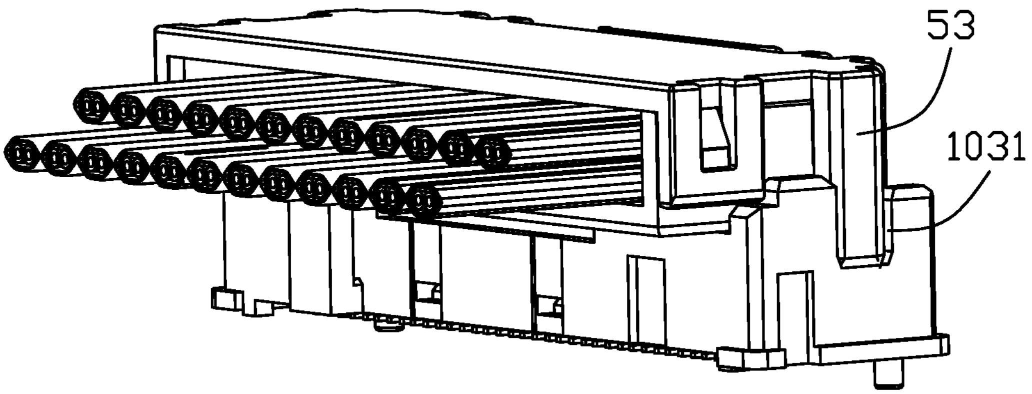
FIG. 16 is similar to FIG. 14, but the board connector is mated with a left-exist cable connector.
Figure 20:
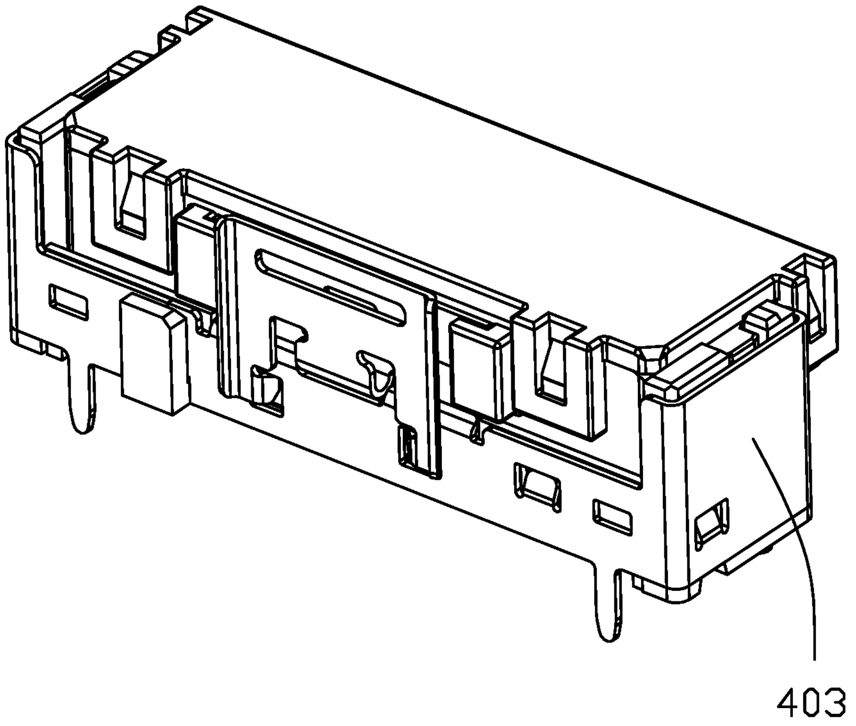
FIG. 20 is a top perspective view of an electrical connector assembly of another embodiment of this present invention.

Referring to FIGS. 13-16, the guiding posts 53 are inserted into the guiding grooves 1031, the first sidewall 101 and the first side plate 401, or the second sidewall 102 and the second side plate 402 are received in the gap 502 after the cable connector 200 is inserted in the board connector 100, the blocking edge 406 is used to guide the locking hooks 6111, preventing from a scratch of the locking hooks 6113 against the first sidewall 101 or the second sidewall 102. Referring to FIG. 13, the end plate 403 has a first height H1, the mated assembly of the two connectors has a whole height H2 which is two times of the first height H2. Referring to FIG. 20, alternatively, the end plates 403 extend upwards and cover the whole endwalls of the board connector. Understandingly, the ratio of H2 to H1 varies 0.5-1. Referring to FIG. 14 and FIG. 3, the cables 80 and the locking member 60 are located at opposite sides of the housing 50. As shown in FIG. 14, the cables 80 extend rightwards from the second side face opposite to the first side face 501 of the housing 50, that is, the cable connector 200 with the cables 80 is a right-exit cable connector 200R, the guiding posts 53 is located proximate to the first side face 501, the width of the guiding posts equaling d3. The right-exist cable connector is inserted in the board connector 100 in an only direction as shown in FIG. 14. Similarly, as shown in FIG. 16, the cables 80 of a left-exist cable connector 200L extends leftward from the first side face 501, the guiding posts 53 space from the first side face with a gap equaling d2. The right-exit cable connector 200R or the left-exit cable connector 200L can be inserted into the board connector100 as requested.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

a longitudinal housing defining a longitudinal direction, the longitudinal housing comprising a first sidewall and a second sidewall opposite to the first sidewall, two endwalls connecting with the first and the second sidewalls, and a mating tongue and defining a receiving cavity among the first and the second sidewalls and the two endwalls and the mating tongue;

two rows of terminals retained in the housing and arranged on opposite surfaces of the mating tongue; and a metallic shell surrounding the longitudinal housing and comprising two side plates respectively covering outer sides of the first and the second sidewalls;

wherein each of the side plates defines a locking hole, at least one of the endwalls defines a guiding groove opening upwards, and a central axis in the longitudinal direction of the mating tongue is offset from a central axis in the longitudinal direction of the guiding groove; and wherein the guiding groove defines a first inner face proximate to the first sidewall and a second inner face opposite to the first inner face and proximate to the second sidewall, a first distance is defined between the first inner face and an inner face of the first sidewall, a second distance is defined between the second inner face and an inner face of the second sidewall, and the first distance is smaller than the second distance.

2. The electrical connector as claimed in claim 1, wherein the endwalls are higher than the sidewalls.

3. The electrical connector as claimed in claim 1, wherein each of the first sidewall and the second sidewall defines a first recess recessed at a top thereof, each side plate defines a blocking edge slanting in the first recess, and the blocking edges and the corresponding side plates overlap from an inserted direction of the electrical connector.

4. The electrical connector as claimed in claim 3, wherein each of the first side wall and the second side wall defines a second recess at an outer face thereof, the second recesses go through the corresponding sidewall in the inserted direction, the blocking edges shelter the second recesses in the inserted direction.

5. The electrical connector as claimed in claim 1, wherein the guiding groove go through the corresponding endwall while the end plates seal the guiding groove in the longitudinal direction.

6. The electrical connector as claimed in claim 1, wherein the end pates fitly cover outer faces of the corresponding endwalls, respectively.

7. An electrical connector comprising:

a longitudinal housing defining a longitudinal direction, the longitudinal housing comprising a first sidewall and a second sidewall opposite to the first sidewall, two endwalls connecting with the first and the second sidewalls, and a mating tongue and defining a receiving cavity among the first and the second sidewalls and the two endwalls and the mating tongue;

two rows of terminals retained in the housing and arranged on opposite surfaces of the mating tongue; and a metallic shell surrounding the longitudinal housing and comprising two side plates respectively covering outer sides of the first and the second sidewalls; wherein each of the side plates defines a locking hole, at least one of the endwalls defines a guiding groove opening upwards, and a central axis in the longitudinal direction of the mating tongue is offset from a central axis in the longitudinal direction of the guiding groove;

the guiding groove defines a first inner face proximate to the first sidewall and a second inner face opposite to the first inner face and proximate to the second sidewall, a first distance is defined between the first inner face and an inner face of the first sidewall, a second distance is defined between the second inner face and an inner face of the second sidewall, and the first distance is smaller than the second distance; and a third distance is defined between the first inner face and the second inner face, and the third distance is larger than the first distance but smaller than the second distance.

* * * * *